US007139657B2

(12) United States Patent
Bouchain et al.

(10) Patent No.: US 7,139,657 B2
(45) Date of Patent: Nov. 21, 2006

(54) METHOD FOR ADAPTING THE CHARACTERISTIC OF AN INJECTION VALVE

(75) Inventors: Jerome Bouchain, Liege (BE); Jürgen Fritsch, Regensburg (DE); Rainer Hirn, Neutraubling (DE)

(73) Assignee: Siemens Aktiegesellschaft, Munich (DE)

( * ) Notice: Subject to any disclaimer, the term of this patent is extended or adjusted under 35 U.S.C. 154(b) by 0 days.

(21) Appl. No.: 10/538,412

(22) PCT Filed: Nov. 27, 2003

(86) PCT No.: PCT/EP03/13378

§ 371 (c)(1), (2), (4) Date: Jun. 10, 2005

(87) PCT Pub. No.: WO2004/053316

PCT Pub. Date: Jun. 24, 2004

(65) Prior Publication Data

US 2006/0047405 A1 Mar. 2, 2006

(30) Foreign Application Priority Data

Dec. 10, 2002 (DE) ................................ 102 57 686

(51) Int. Cl.
*G06F 117/00* (2006.01)
*F02M 51/00* (2006.01)
*F02D 41/38* (2006.01)

(52) U.S. Cl. ....................... 701/104; 123/480; 123/299

(58) Field of Classification Search ................ 701/104, 701/103, 105; 123/480, 299, 300

See application file for complete search history.

(56) References Cited

U.S. PATENT DOCUMENTS

| | | | | |
|---|---|---|---|---|
| 5,070,836 | A | 12/1991 | Wahl et al. | |
| 6,021,754 | A | 2/2000 | Kendrick | |
| 6,463,910 | B1 * | 10/2002 | Nishiyama | 123/456 |
| 6,584,953 | B1 * | 7/2003 | Yomogida | 123/300 |

FOREIGN PATENT DOCUMENTS

| | | | |
|---|---|---|---|
| DE | 38 03 078 | A1 | 8/1989 |
| DE | 196 26 690 | A1 | 1/1998 |
| DE | 197 20 009 | A1 | 11/1998 |
| DE | 100 11 690 | A1 | 9/2001 |
| EP | 0 940 571 | A2 | 9/1999 |
| GB | 2 215 487 | A | 9/1989 |

* cited by examiner

*Primary Examiner*—Hieu T. Vo
(74) *Attorney, Agent, or Firm*—Laurence A. Greenberg; Werner H. Stemer; Ralph E. Locher

(57) ABSTRACT

The invention relates to a method for adapting an injection valve characteristic curve of a controlled fuel injection valve for an internal combustion engine, said curve reflecting the reference injection behaviour, to alterations in the actual injection behaviour caused by ageing. According to said method: during an operating mode of the internal combustion engine, which does not require an injection of fuel, the injection valve is intermittently controlled in accordance with a control period, said mode alternating with a period of no fuel injection, i.e. at least one working cycle with injection-valve control follows or precedes a working cycle without injection-valve control; at least one respective RPM value of the internal combustion engine is detected for the controlled working cycle and for at least one of the working cycles without control; a differential between the detected values is calculated and said differential is used to correct the characteristic curve.

11 Claims, 2 Drawing Sheets

METHOD FOR ADAPTING THE CHARACTERISTIC OF AN INJECTION VALVE

BACKGROUND OF THE INVENTION

Field of the Invention

The present invention relates to a method for adapting an injection valve characteristic, said characteristic representing a reference injection behavior, of a triggered fuel injection valve of an internal combustion engine to aging-related changes or manufacturing-related variations of an actual injection behavior.

For the purpose of fuel allocation, injection valves in internal combustion engines are controlled in such a way that an optimal fuel quantity enters the combustion chambers at any operating point. For example, in the case of diesel internal combustion engines which are operated with direct fuel injection, fuel that is under high pressure is injected into the combustion chambers from a fuel accumulator. The metering of the fuel quantity which is introduced into the combustion chamber is done by triggering the injection valves in a suitable manner, said injection valves also being referred to as injectors. The metering is usually time-controlled in this case, i.e. the injection valve is opened for a precisely specified time and then closed again. A control device of the internal combustion engine predetermines an opening instant and an opening duration of the injection valve. A control signal is applied to e.g. an electrically activated injection valve in this case, wherein said signal predetermines a trigger duration.

The control device can effect an assignment between the trigger duration and the metered fuel mass; an injection valve characteristic is stored for this purpose in the control device, and establishes a relationship between the injected fuel quantity and the trigger duration of the injection valve, wherein other conditions such as fuel pressure or fuel temperature are also taken into consideration.

The injection valve characteristic assumes a standard injection valve which corresponds to certain specifications. However, since the injection behavior of each individual injection valve always varies slightly in principle, certain differences arise with regard to the delivered fuel volume from injection valve to injection valve in the case of fixed trigger durations. This results in irregular running of the internal combustion engine and, above all, in poor exhaust values. In order to ensure that strict exhaust standards can nonetheless be met, the permitted tolerances for the injection valves must be kept as low as possible, this being very expensive.

Even then, however, aging-related wear effects of the injection valve can cause variations to occur between the actual injection behavior and the reference injection behavior as specified in the injection valve characteristic. In order to compensate for such variations, it would be conceivable in principle to modify the stored injection valve characteristic during the service life of the internal combustion engine in a controlled manner towards a reference injection behavior for an aged reference injection valve. However, such a simply controlled and therefore very unspecific modification could not take into consideration the individual characteristics of an injection valve. Furthermore, significant problems arise if an injection valve is replaced during the service life of an internal combustion engine.

Alternatively, it would be conceivable to provide an additional knock sensor, by means of which the combustion noise of the internal combustion engine is monitored. It would then be possible to determine the trigger time which is required for implementing a combustion noise. However, it is still only possible to determine a minimal trigger time at which the injection valve starts to deliver a fuel mass in a stable manner. Moreover, this method is relatively imprecise. It is also very expensive because an additional sensor including a corresponding signal capture circuit must be provided.

SUMMARY OF THE INVENTION

The invention therefore addresses the problem of specifying a method for adapting an injection valve characteristic, said characteristic representing a reference injection behavior, of a triggered fuel injection valve of an internal combustion engine to aging-related changes of an actual injection behavior, which method allows an individual adaptation to be performed for each injection valve.

In accordance with the invention, this problem is solved by a method for adapting an injection valve characteristic, said characteristic representing a reference injection behavior, of a triggered fuel injection valve of an internal combustion engine to aging-related changes of an actual injection behavior, wherein during an operating state of the internal combustion engine, which operating state does not require a fuel injection, the injection valve is triggered intermittently in accordance with a trigger duration, while otherwise no fuel injection occurs, such that at least one work cycle with triggering follows or precedes at least one work cycle without triggering of the injection valve, a rotational-speed value or a value of a rotational-speed-dependent variable of the internal combustion engine is detected in each case for the work cycle with triggering and for at least one of the work cycles without triggering and a difference between the detected values is established and a correction of the injection characteristic is effected thereupon.

In accordance with the invention, therefore, the injection valve is intermittently triggered in accordance with a trigger duration during an operating state of the internal combustion engine, which operating state did not actually require a fuel injection. Therefore a work cycle with triggering of the injection valve alternates with a work cycle in which the injection valve is not triggered, i.e. the internal combustion engine runs entirely without fuel injection. This results in a switching on and switching off of the injection valve whose injection behavior must be adapted. As a result of the comparison of the rotational-speed value or rotational-speed-dependent value, which comparison is then performed in accordance with the invention, a correction of the injection characteristic is effected. The rotational-speed information which is analyzed in this regard, being either the rotational speed itself or a rotational-speed-dependent variable, changes if an injection occurs which generates an angular momentum. The change is dependent on the injected fuel mass in this case, and therefore it is possible to correct not only the implementation of an injection above a certain minimal trigger duration but also the complete injection characteristic, i.e. the dependency of the fuel mass that is delivered by the injection valve on the trigger duration.

In order to adapt the complete injection characteristic of the injection valve to the actual injection behavior, it is obviously necessary to perform an injection over the widest possible range of trigger durations and other injection parameters such as fuel pressures, for example. It is therefore preferable to increase the trigger duration step-by-step, wherein the step size is dependent on the desired accuracy of the correction of the injection valve characteristic. Two steps, with which a check is performed using a minimal and a maximal trigger duration, are sufficient in principle, for example.

The fuel mass which is delivered by the injection valve causes the internal combustion engine to deliver an angular momentum. This angular momentum is naturally shown in the rotational-speed information. Rather than analyzing the rotational-speed information directly, however, it is expedient to first calculate an angular momentum value for an angular momentum which was caused by the triggering of the injection valve with the trigger duration. The calculation of this angular momentum value has the advantage that the value which is ultimately sought for the fuel mass can then be obtained by means of a simple conversion. The corresponding ratios for this are generally stored in the control device of the internal combustion engine, since modern control devices normally perform a so-called angular momentum-based control in which a preferred angular momentum is determined and a fuel mass is derived therefrom. Therefore if a angular momentum value is specified, as in the preferred embodiment, the conversion which is used anyhow in the angular momentum-based control simply has to be applied in the opposite direction.

The specification of the angular momentum value can be done by means of a suitable analysis of the rotational-speed gradient. If an internal combustion engine runs under overrun cut-off, the rotational speed will generally decrease. It is evident that a rotational-speed gradient for work cycles in which the injection valve, whose injection valve characteristic is to be adapted, is triggered is different to that for work cycles in which there is no activation of the injection valve whatsoever. Analysis of the rotational-speed gradient therefore allows the aforementioned angular momentum value to be generated easily.

In a preferred embodiment, the angular momentum value is therefore calculated in accordance with the following formula:

$$D=(\pi/F1).M.(dN+-dN-)+dJ,$$

where F1 is a factor that is dependent on a number of cylinders, D is the angular momentum value, M is the moment of inertia of the internal combustion engine, dN+ is a rotational-speed gradient of the work cycle with triggering of the injection valve, dN− is a rotational-speed gradient of one of the work cycles without triggering of the injection valve, and dJ is a factor for a braking moment which is caused by internal friction of the internal combustion engine and can be dependent on the rotational speed.

The difference between the rotational-speed gradient of the work cycle with triggering of the injection valve and of one of the work cycles without triggering of the injection valve is therefore a suitable variable for the calculation of the angular momentum in a preferred embodiment. The equation can be applied to internal combustion engines with any number of cylinders. Depending on the number of cylinders, a different prefactor F occurs. In the case of four cylinders, F1=30.

The moment of inertia M of the internal combustion engine is influenced by the centrifugal mass of pistons, crankshaft, camshaft and possible centrifugal masses, and represents a variable which is fixed and unchanging for an internal combustion engine.

The braking moment of the internal combustion engine is caused by internal friction and is generally also a largely constant variable which can be determined easily on a testing stand in the same way as the moment of inertia. In order to make the effect of the rotational-speed gradient as great as possible, it is advantageous to minimize the braking moment. To this end, for example, a drive train which is driven by the internal combustion engine can be disconnected for the purpose of the method for adapting the injection valve characteristic, e.g. by activating a corresponding clutch.

Furthermore, in order to improve the signal/noise ratio, the claimed method, i.e. the intermittent triggering of the injection valve and the triggering of the rotational-speed information, can be executed several times with an unchanged trigger duration.

In the case of multi-cylinder internal combustion engines, a segment wheel which has a divisional structure and is driven by the internal combustion engine is usually sampled and the rotational-speed information is captured in the form of segment times for which the passage of a specific segment of the segment wheel lasts. In this case, a segment is normally allocated to the working stroke of a cylinder of the multi-cylinder internal combustion engine. Given a rotational-speed capture of this type, it is particularly easy to determine the difference between the segment times for a cylinder without and with triggering of the injection valve and to use said difference for adapting the injection valve characteristic.

In this regard, a method is therefore preferred in which a segment wheel that is driven by the internal combustion engine is sampled and a first work cycle without triggering of the injection valve of a specific cylinder then a second work cycle with triggering of the injection valve of the specific cylinder and then a third work cycle without triggering of the injection valve of a specific cylinder are executed, wherein a segment time is determined in at least the first, second and third work cycle for the specific cylinder, said segment time being the duration of the passage of a segment of the segment wheel during the working stroke of the cylinder, and wherein the angular momentum is calculated in accordance with the following equation:

$$D=F2.\pi.M((Tx3-Tx2)/(ST-)^3)-(Tx2-Tx1)/(ST+)^3)+dJ,$$

where F2 is a factor that is dependent on the number of cylinders, D is the angular momentum value, M is the moment of inertia of the internal combustion engine, dJ is a factor for a braking moment which is caused by internal friction of the internal combustion engine, Tx1 is the segment time for the specific cylinder in the first work cycle, Tx2 is the segment time for the specific cylinder in the second work cycle, Tx3 is the segment time for the cylinder in the third work cycle, ST− is the average total duration of the passage of all segments during a work cycle without triggering of the injection valve, and ST+ is the average total duration of the passage of all segments during one of the work cycles with triggering of the injection valve.

In this embodiment, it is usual to make use of the average total duration of the passage of all segments for the working cycle in which the segment times specified in the denominator of the equation were also obtained. This is not essential, however, and other total durations, e.g. from previous work cycles, can also be used depending on rotational-speed capture.

Going beyond the above equation, it is also possible to calculate and analyze higher divisional orders of the segment times in the form of difference quotients, in order to increase the accuracy of the angular momentum or injection-volume specification. Using signal-analysis methods, it is also possible to analyze the overall profile of the rotational-speed decrease over a larger number of work cycles with and without injection, in order thus to identify and eliminate interference effects such as torsional vibrations of the drive train and therefore again to increase the accuracy of the calculation of the angular momentum or injection volume.

In the aforementioned developments for calculating the angular momentum value D, a factor is used for a braking moment which is caused by internal friction of the internal combustion engine. A particularly accurate assessment of this factor, which is additionally included in the equations, is obtained by using the braking moment for the relevant work cycle in which the injection valve was triggered or not triggered. In this regard, a preferred method for determining the factor for the braking moment which is caused by the internal friction of the internal combustion engine therefore provides for establishing a difference between two values, wherein one value is assigned to one of the work cycles of the internal combustion engine without triggering of the injection valve and the other is assigned to the work cycle of the internal combustion engine with triggering of the work cycle.

In most cases, the injection valve characteristic which must be adapted to the actual injection behavior of an injection valve is present in the form of a link between fuel mass and trigger duration. For the purposes of the adaptation in such cases, it is preferable for a fuel-mass value relating to a fuel mass which is delivered by the injection valve to be derived from the rotational-speed value or the angular momentum value, and for said fuel-mass value to be assigned to the value for the trigger duration for which the fuel-mass value was obtained. By means of this assignment, it is then possible easily to correct an injection valve characteristic, said correction containing the aforementioned mapping between trigger duration and fuel-mass value.

BRIEF DESCRIPTION OF THE DRAWING

The invention is described in greater detail below for exemplary purposes with reference to the drawing, in which.

DESCRIPTION OF THE PREFERRED EMBODIMENTS

Figure 1:
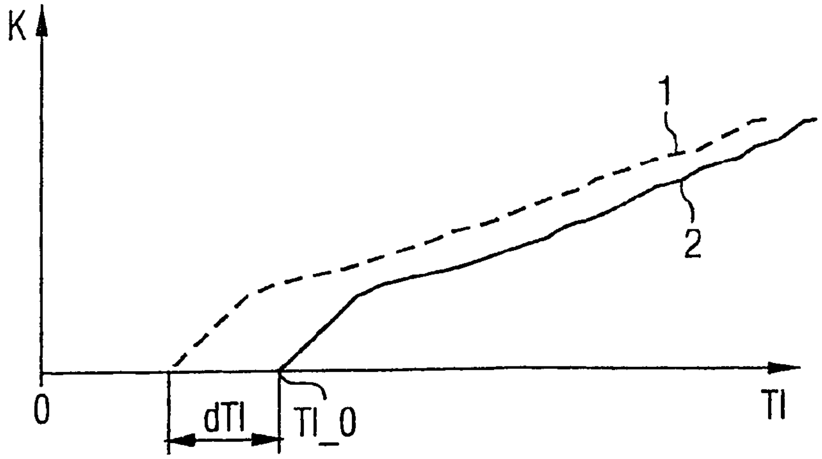
FIG. 1 shows a diagram in which a fuel mass which is delivered by an injection valve is plotted over the trigger duration of the injection valve.

FIG. 1 shows the injection valve characteristic of an electrically triggered injection valve of an internal combustion engine (not shown). In this case, a fuel mass K is plotted over a trigger duration TI. The injection valve is triggered to deliver a fuel mass by means of a corresponding electrical trigger signal, i.e. the control device instructs the injection valve which is supplied by a fuel accumulator to open for the trigger duration TI. Due to mechanical and electrical factors, however, the injection valve will only then follow above a certain minimal trigger duration which is illustrated in FIG. 1 as start value TI_0. Shorter trigger durations cannot be achieved. If the start value TI_0 is exceeded, the injection valve delivers a fuel mass which depends on the trigger duration in accordance with the characteristic as shown in FIG. 1. The characteristic 1 which is shown as a broken line in FIG. 1 is stored in the control device in the case of a newly supplied internal combustion engine and assumes a reference injection behavior of a new value injection valve which satisfies specific specifications.

Also illustrated in FIG. 1 as a continuous line is an exemplary characteristic 2 of an aged injection valve. It can be seen that the start value TI_0, which a trigger duration TI must exceed in order to cause a fuel mass to be delivered by the injection valve, is greater than the start value for the reference injection behavior as per characteristic 1. Due to manufacturing tolerances and/or changes which occur during the service life of the injection valve as a result of wear effects or similar, a shift dTI appears between the start points. As a result of this shift, a different trigger duration TI is required in the case of an injection valve having the characteristic 2 to that which is required in the case of a reference injection valve having the characteristic 1, in order to deliver the same fuel mass. The shift can extend over longer or shorter trigger durations depending on aging/manufacturing nonconformity.

The deviation from the characteristic 1 which is provided as a basis by the control device during the control results in a degraded performance and exhaust behavior of the internal combustion engine. In the adaptation which is outlined below, this deviation is rectified by correcting the reference characteristic 1 in such a way that it is identical to the actual characteristic 2.

The illustration in FIG. 1 suggests that, in order to adapt the actual injection behavior as per characteristic 2 to the reference injection behavior as per characteristic 1, it could suffice to determine the shift dTI. This might indeed suffice in most cases, but aging effects which are caused by wear at the injection valve can also prevent the characteristic 2, which represents the injection behavior, from being obtained from the characteristic 1 of the reference injection behavior by means of a simple parallel shift along the x axis. Further variations between the characteristics 1 and 2 can also arise due to aging. This is clear e.g. from the profile of the characteristic 1 in the area of higher trigger durations TI; in this section the shift between the characteristic 1 and the characteristic 2 is smaller than in the area of lower fuel masses K or in the area of the start value TI_0.

In order now to adapt the characteristic 1 which is used in the control device of the internal combustion engine to the actual injection behavior as per characteristic 2, the fuel mass K which is delivered by the relevant injection valve is determined as a function of the trigger duration TI in an adaptation method.

An overrun cut-off phase of the internal combustion engine is used for this purpose, in which phase the internal combustion engine is also separated from an external drive train of the vehicle which is driven by the internal combustion engine by means of releasing a clutch in order to eliminate external braking moments. The internal combustion engine is essentially operated without fuel in the overrun cut-off phase, whereby the rotational speed decreases sharply until an idle controller intervenes in order to stabilize the operation of the internal combustion engine at idle speed.

In this case, "essentially" operated without fuel supply is understood to mean that a fuel supply only occurs for the purpose of the adaptation method, but is not actually desired or required in this operating state.

In order to adapt the characteristic of the injection valve, the injection valve is intermittently triggered in accordance with a trigger duration in the overrun cut-off phase, i.e. work cycles of the internal combustion engine, in which work cycles the injection valve is triggered to open for a specific trigger duration, alternate with work cycles in which the injection valve is not activated.

Figure 2:
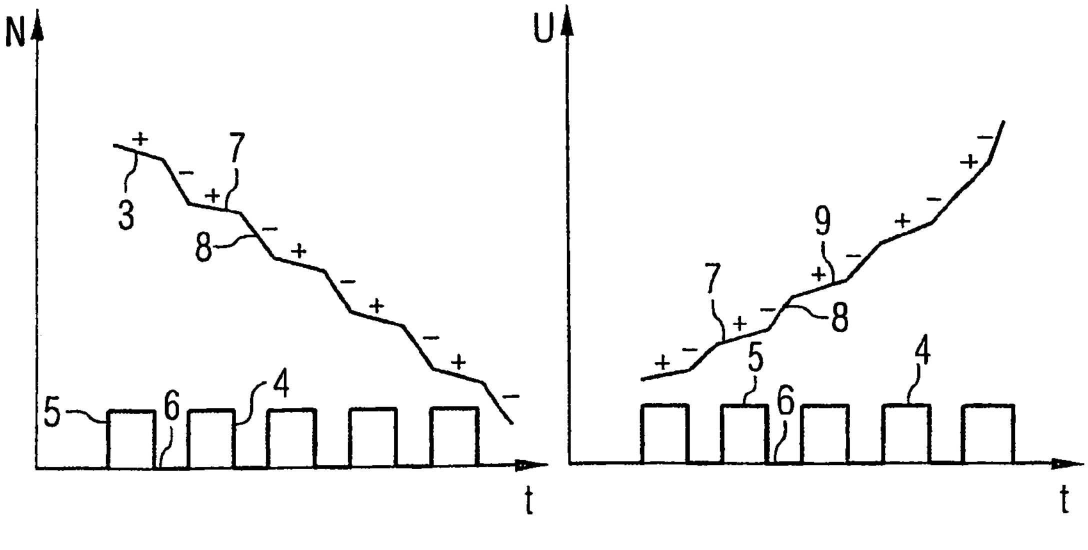
FIG. 2 shows two diagrams in which the rotational speed of the internal combustion engine or the revolution duration of a segment wheel which is connected to the crankshaft of an internal combustion engine are plotted as a time series which is produced when the claimed method is executed.

By means of a time series in each case, FIG. 2 shows the profile of the rotational speed N of the internal combustion engine and of a revolution duration U of a segment wheel which is driven by the internal combustion engine and is non-rotatably connected to the crankshaft of the internal combustion engine. The rotational-speed profile is illustrated with a trigger signal 4 in the left-hand time series of FIG. 2. The rotational-speed profile 3 represents the time-related development of the rotational speed of the internal combustion engine. The trigger signal 4 is the signal by means of which an injection valve is triggered during the overrun cut-off of the internal combustion engine. The trigger signal 4 is composed of trigger pulses 5 and intermediate pauses 6. During the time duration of a trigger pulse 5, the injection valve is triggered in accordance with a trigger duration. If this is greater than the start value TI_0 the injection valve opens and a cylinder of the internal combustion engine, which cylinder is supplied by the injection valve, executes a working stroke because fuel is allocated. Working strokes of the cylinder which are in the pauses 6 take place without the injection valve being triggered to open. These are therefore working strokes in which the corresponding cylinder is disconnected.

The trigger signal 4 therefore represents a binary signal which indicates whether the injection valve whose characteristic must be adapted is actually triggered. The width of the trigger pulse 5 in FIG. 2 does not represent the trigger duration, but merely indicates whether the injection valve is triggered in a work cycle.

Since the internal combustion engine is in an overrun cut-off phase, the rotational speed N decreases. However, this decrease takes place with varying gradients, since an injection valve is intermittently triggered by the trigger pulses 5.

The rotational-speed profile 3 exhibits a lesser slope in work cycles for which a trigger pulse 5 is drawn, i.e. in which the injection valve opens, than when the trigger signal indicates a pause 6, i.e. the injection valve remains closed. The sections with a lesser slope are marked with a "+" and given the reference sign 7. The sections with a greater gradient, i.e. with a faster decreasing rotational-speed profile are marked with a "−" and have the reference sign 8.

In addition to the trigger signal 4, the right-hand illustration in FIG. 2 shows a passage-duration profile which represents the time-related development of the revolution duration U of the segment wheel. The revolution duration U is inversely proportional to the rotational speed N. In the sections 7 of the passage duration profile 9, the revolution duration increases less than in the sections 8, this being again conditional upon the triggering of the injection valve which indicates a trigger pulse 5 during the sections 7 and a pause 6 in the sections 8.

The lesser slope of the rotational-speed profile 3 in the phases 7 in which the injection valve is triggered with a trigger duration according to the trigger pulse 5 stems from the fact that due to the fuel injection the corresponding cylinder of the internal combustion engine delivers an angular momentum. This angular momentum contribution depends on the trigger duration with which the injection valve is triggered in the trigger pulses and is determined as per the following equation in a first embodiment:

$$D=(\pi/F).M.(dN+-dN-)+dJ,$$

where F is a factor that is dependent on a number of cylinders, D is the angular momentum value, M is a moment of inertia of the internal combustion engine, dN+ is a rotational-speed gradient of the work cycle with triggering of the injection valve, dN− is a rotational-speed gradient of one of the work cycles without triggering of the injection valve, and dJ is a factor for a braking moment which is caused by internal friction of the internal combustion engine. The factor F has the value 30 for a four-cylinder internal combustion engine. The rotational-speed gradient dN+ is given by the slope of the rotational-speed profile 3 in the section 7 and the rotational-speed gradient dN− by the slope of the sections 8 of the rotational-speed profile 3.

The factor dJ takes into consideration a braking moment which is caused by internal friction of the internal combustion engine. When the drive train is disconnected, this braking moment depends solely on the construction or operating parameters of the internal combustion engine itself and can be taken from a characteristic map, for example. The braking moment is particularly dependent on the rotational speed, and therefore in an alternative embodiment two values are determined and the difference is established for the braking moment at the average rotational speed in the section 7 and section 8, said sections being used for the calculation of the angular momentum as per the above equation, wherein when establishing the difference the braking moment at the instant when dN− was determined is subtracted from the braking moment at the instant when dN+ was determined in order to specify the factor dJ.

The angular momentum value D as calculated using the above equation represents the angular momentum which was generated by the triggering of the injection valve with the trigger duration that was used for the adaptation. This angular momentum can be converted into the desired fuel mass K in a manner which is known to a person skilled in the art, e.g. by means of a characteristic map.

Figure 4:
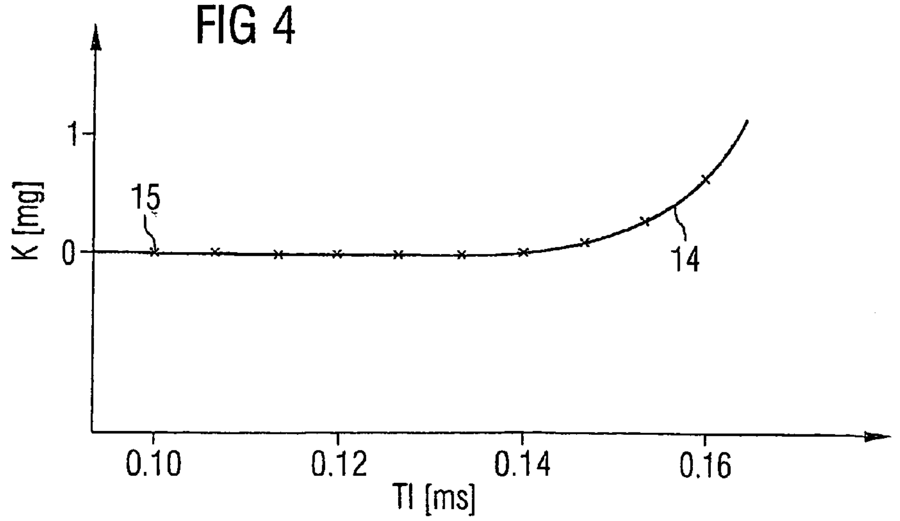
FIG. 4 shows the fuel mass which is delivered by an injection valve as a function of the trigger duration of the injection valve, together with measuring points which are used for the correction.

The described adaptation is now repeated for various trigger durations in order to obtain a set of value pairs which consist in each case of an angular momentum value and a trigger duration or a fuel-mass value and a trigger duration. FIG. 4 shows the outline of the value pairs which are obtained for an exemplary injection valve. The fuel mass K (in mg) is plotted over the trigger duration TI (in ms). A fuel mass of 1 mg is delivered in the case of a trigger duration of slightly more than 0.16 ms.

Each measuring point corresponds to one execution of the method for adaptation given a specific trigger duration, wherein the angular momentum calculated as described above was also converted by means of a known connection into a fuel mass that was delivered by the injection valve in the method for adaptation. It can be seen that the injection valve only starts to deliver a fuel mass above a certain trigger duration. The lower limit corresponds to the start value TI_0 in FIG. 1. The illustration in FIG. 4 also shows that the resolution for the adaptation is in the range of 0.1 to 0.2 mg.

The curve 14 which is illustrated in FIG. 4 can therefore be used as a characteristic 1 which is assigned to the corresponding injection valve in the operation of the internal combustion engine, or for correcting the characteristic 1 in accordance with the curve 14. In this regard, FIG. 4 shows a small section of the characteristic 2 from the FIG. 1 around the start value TI_0.

Figure 3:
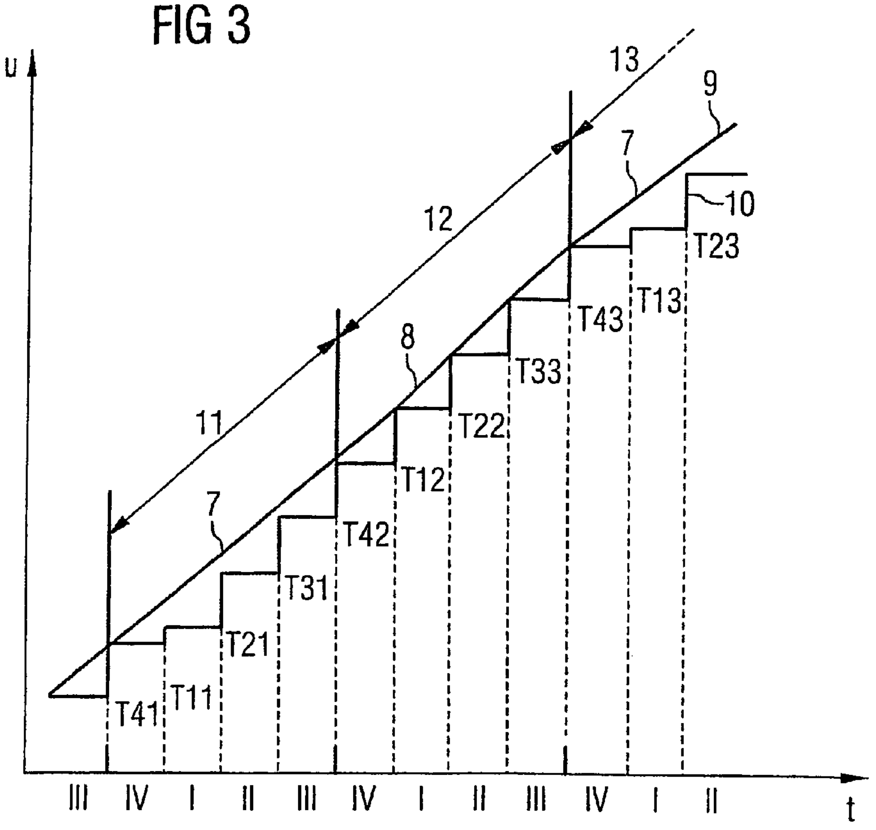
FIG. 3 shows a detailed section of the illustration from FIG. 2.

FIG. 3 illustrates a second embodiment of the method with which an adaptation of the injection valve characteristic can be achieved. In this case, FIG. 3 shows a section of the passage duration profile 9 of the right-hand illustration from FIG. 2. Consecutive sections 7 and 8 are illustrated in a section of the passage duration profile 9 in FIG. 3, wherein each section corresponds to a work cycle. A segment signal 10 is also shown and represents the segment durations for which the passage of a segment of the segment wheel lasts, wherein each segment is assigned to exactly one cylinder of a four-cylinder internal combustion engine. The corresponding work sequence of the cylinders is also plotted using Roman numerals on the time axis which shows the time t. The internal combustion engine which is considered in the example therefore has the work cycle sequence IV, I, II and III. This is the sequence in which the cylinders of the four-cylinder internal combustion engine execute their working strokes within a work cycle.

The characteristic of the cylinder I is adapted in the following adaptation method.

In three consecutive work cycles 11 to 13, the injection valve of the cylinder I is first triggered in accordance with a trigger duration in a first work cycle 11. In the subsequent second work cycle 12, there is no triggering of the injection valve of the cylinder I, i.e. the trigger signal 4 specifies a pause 6. In the subsequent third work cycle 13, the trigger signal 4 specifies a trigger pulse 5 again, i.e. the injection valve of the cylinder I is again triggered in accordance with a trigger duration, this being the same trigger duration as in the work cycle 11. The sections 7, 8 and again 7 of the passage duration profile 9 are produced by the sequence from the first work cycle 11 to the third work cycle 13.

The associated segment time T is plotted for each work cycle of the cylinders I, II and III in FIG. 3, wherein a suffix of two Arabic numerals is also added, of which the first numeral represents the cylinder number and the second numeral represents the work cycle (1: first work cycle, 2: second work cycle, 3: third work cycle).

FIG. 3 shows clearly that as a result of the triggering of the injection valve of the first cylinder in the first work cycle and the third work cycle, T11 and T13 are much shorter than the segment time T12 in the second work cycle in which the injection valve of the cylinder I is not triggered. The shorter segment times T11 and T13 are therefore produced because the cylinder I delivers a angular momentum in the first work cycle 11 and in the third work cycle 13. This in turn is due to the injection valve introducing a fuel mass into the combustion chamber of the cylinder I as a result of the triggering with a trigger duration.

The angular momentum which is produced by this injection is now calculated according to the following equation:

$$D=F2.\pi.M((Tx3-Tx2)/(ST-)^3)-(Tx2-Tx1)/(ST+)^3)+dJ,$$

where F2 is a factor that is dependent on the number of cylinders (16 in the case of a four-cylinder internal combustion engine), D is the angular momentum value, M is the moment of inertia of the internal combustion engine, dJ is a factor for a braking moment which is caused by internal friction of the internal combustion engine, Tx1 is the segment time for the specific cylinder in the first work cycle, Tx2 is the segment time for the specific cylinder in the second work cycle, Tx3 is the segment time for the cylinder in the third work cycle, ST− is the average total duration of the passage of all segments during a work cycle without triggering of the injection valve and ST+ is the average total duration of the passage of all segments during one of the work cycles with triggering of the injection valve.

The above statements in relation to the first embodiment apply to the moment of inertia of the internal combustion engine and to the factor dJ. In this case, the difference for calculating the factor dJ can be determined using the equation $$dJ=J(120/ST-)-J(120/ST+),$$

for example, wherein a segment wheel having 120 part segments or teeth is assumed and J designates the rotational-speed-dependent braking moment of the internal combustion engine. This value is stored for executing the adaptation in the control device of the internal combustion engine and is obtained from a testing stand measurement, for example.

As in the aforementioned first exemplary embodiment, the value pair is formed from the angular momentum value and the associated trigger duration. The value pairs for different trigger durations then allow a correction of the reference injection valve characteristic, if necessary after converting the angular momentum values into values for fuel masses.

We claim:

1. A method for adapting an injection valve characteristic, the injection valve characteristic representing a reference injection behavior, of a triggered fuel injection valve of an internal combustion engine to aging-related changes or manufacturing-related variations of an actual injection behavior, which comprises the steps of:

a) during an operating state of the internal combustion engine, the operating state not requiring a fuel injection, triggering an injection valve intermittently in accordance with a trigger duration, while otherwise no fuel injection occurs, such that at least one work cycle with triggering follows or precedes at least one work cycle without triggering of the injection valve;

b) detecting a rotational-speed value or a value of a rotational-speed-dependent variable of the internal combustion engine in each case for the work cycle with triggering and for at least one of the work cycles without triggering; and c) establishing a difference between detected values and a correction of the injection valve characteristic being effected thereupon.

2. The method according to claim 1, which further comprises calculating derivatives of a first and/or higher order from the differences between the detected values.

3. The method according to claim 2, which further comprises:

calculating the differences on a basis of measured segment times;

calculating difference quotients from the differences; and deriving the derivatives of the first and higher order therefrom.

4. The method according to claim 1, which further comprises:

analyzing an overall profile of the rotational-speed value or of the rotational-speed-dependent variable using signal-analysis methods over a plurality of the work cycles with and without triggering; and identifying and eliminating interference effects.

5. The method according to claim 1, which further comprises increasing the trigger duration step-by-step.

6. The method according to claim 1, which further comprises during the establishing of the difference step, calculating an angular momentum value for an angular momentum which was produced by triggering of the injection valve with the trigger duration.

7. The method according to claim 6, which further comprises calculating the angular momentum value in accordance with the following formula:

$$D=(\pi/F1)*M*(dN+-dN-)+dJ,$$

where F1 is a factor that is dependent on a number of cylinders, D is the angular momentum value, M is a moment of inertia of the internal combustion engine, dN+ is a rotational-speed gradient of the work cycle with triggering of the injection valve, dN− is a rotational-speed gradient of one of the work cycles without triggering of the injection valve, and dJ is a factor for a braking moment which is caused by internal friction of the internal combustion engine.

8. The method according to claim 7, which further comprises establishing a difference between two values for determining a factor for the braking moment which is caused by the internal friction of the internal combustion engine, wherein one value is assigned to one of the work cycles of the internal combustion engine without triggering of the injection valve and the other is assigned to the work cycle of the internal combustion engine with triggering of the work cycle.

9. The method according to claim 6, which further comprises:

using a multi-cylinder internal combustion engine as the internal combustion engine;

sampling a segment wheel driven by the internal combustion engine;

executing a first work cycle without triggering of the injection valve of a specific cylinder, then a second work cycle with triggering of the injection valve of the specific cylinder, and then a third work cycle without triggering of the injection valve of the specific cylinder, wherein a segment time is specified in at least the first, second and third work cycle for the specific cylinder, the segment time lasting for a passage of a segment of the segment wheel during a working stroke of the specific cylinder; and calculating the angular momentum in accordance with the following equation:

$$D=F2*\pi*M((Tx3-Tx2)/(ST-)^3)-(Tx2-Tx1)/(ST+)^3)+dJ$$

where F2 is a factor that is dependent on a number of cylinders, D is the angular momentum value, M is a moment of inertia of the internal combustion engine, dJ is a factor for a braking moment which is caused by internal friction of the internal combustion engine, Tx1 is the segment time for the specific cylinder in the first work cycle, Tx2 is the segment time for the specific cylinder in the second work cycle, Tx3 is the segment time for the cylinder in the third work cycle, ST−is a average total duration of a passage of all segments during a work cycle without triggering of the injection valve and ST+ is an average total duration of a passage of all segments during one of the work cycles with triggering of the injection valve.

10. The method according to claim 6, which further comprises:

deriving a fuel-mass value for a fuel mass that is delivered by the injection valve from the angular momentum value;

assigning the fuel-mass value to the trigger duration and used for correcting the injection valve characteristic.

11. The method according to claim 1, which further comprises executing the steps a) and b) several times with an unchanged trigger duration for providing noise suppression.

* * * * *